United States Patent [19]

Pederson et al.

[11] Patent Number: 4,880,772
[45] Date of Patent: Nov. 14, 1989

[54] PREPARATION OF THIN CERAMIC FILMS VIA AN AQUEOUS SOLUTION ROUTE

[75] Inventors: Larry R. Pederson, Kennewick; Lawrence A. Chick; Gregory J. Exarhos, both of Richland, all of Wash.

[73] Assignee: Battelle Memorial Institute, Richland, Wash.

[21] Appl. No.: 204,643

[22] Filed: Jun. 9, 1988

[51] Int. Cl.$^4$ .................... B05D 3/02; B05D 5/06; B05D 5/12; C23C 18/02
[52] U.S. Cl. .................................. 505/1; 427/62; 427/63; 427/226; 427/168
[58] Field of Search ............... 427/62, 63, 226, 168; 505/1

[56] References Cited

U.S. PATENT DOCUMENTS 2,763,569  9/1956  Bradstreet et al. ............ 427/226

OTHER PUBLICATIONS

Kawai et al "Formation of Y-$B_a$-$C_u$-O Superconducting Film by a Spray Pyrolysis Method", Jpn. J. Appl. Phys. vol, 26(10) Oct. 1987 L1740-L1742.

Primary Examiner—Richard Bueker
Assistant Examiner—Roy V. King
Attorney, Agent, or Firm—Marger & Johnson

[57] ABSTRACT

A new chemical method of forming thin ceramic films has been developed. An aqueous solution of metal nitrates or other soluble metal salts and a low molecular weight amino acid is coated onto a substrate and pyrolyzed. The amino acid serves to prevent precipitation of individual solution components, forming a very viscous, glass-like material as excess water is evaporated. Using metal nitrates and glycine, the method has been demonstrated for zirconia with various levels of yttria stabilization, for lanthanum-strontium chromites, and for yttrium-barium-copper oxide superconductors on various substrates.

7 Claims, 4 Drawing Sheets

4,880,772

PREPARATION OF THIN CERAMIC FILMS VIA AN AQUEOUS SOLUTION ROUTE

This work was conducted for the U.S. Department of Energy, Office of Basic Energy Sciences, under Contract DE-AC06-76RL 01830. The United States Government has certain rights in this invention.

INTRODUCTION

A wide variety of thin ceramic films have been prepared by various vacuum techniques and by chemical methods (1-6). Vacuum techniques generally suffer from the requirement of relatively sophisticated apparatus and/or area and geometrical constraints. Advantages of chemical solution methods include simplicity, low cost, and precise control of film stoichiometry. In this application, we present a new, very simple method to prepare thin ceramic films from an aqueous solution of metal nitrates and an amino acid. The amino acid serves to complex the metal cations in the aqueous solution, preventing precipitation of individual components during subsequent processing steps.

SUMMARY OF THE INVENTION

A new route to producing thin ceramic films has been developed from an aqueous solution of metal nitrates and a low molecular weight amino acid. Films can be prepared at room temperature by spraying or by spin- or dip-coating a substrate of choice with the metal nitrate/amino acid solution, followed by pyrolysis. The amino acid serves to prevent precipitation of individual solution components, forming a very viscous, glass-like material as excess water is evaporated. Breakdown products of the amino acid and nitrate ions are removed from the thin film during pyrolysis. Employing inexpensive and readily available materials, the method appears applicable to the production of a wide range of thin ceramic film compositions.

Depending on their compositions, these films have utility as superconductors, in sensors, as anti-corrosion coatings, as abrasion-resistant coatings, as optical coatings, or for other uses.

DETAILED DESCRIPTION

Film Formation

Figure 1:
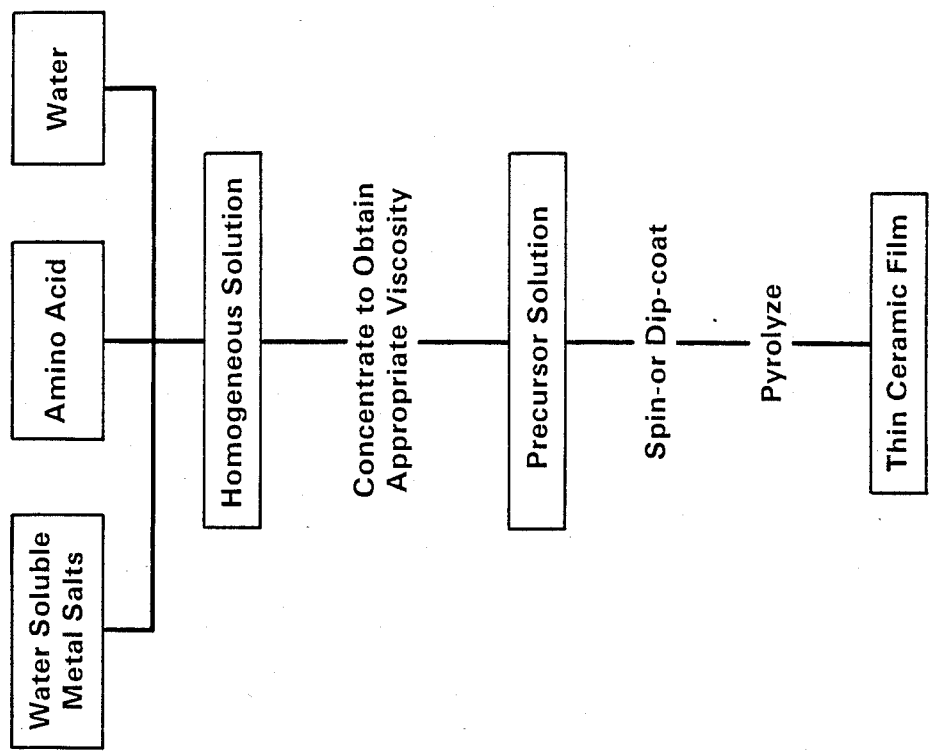
FIG. 1 is a flow chart outlining the steps of producing thin ceramic films.

An aqueous precursor solution is prepared containing the nitrate salts of the metals and a low molecular weight amino acid, such as glycine. Metal cation concentrations will normally be in the range of $10^{-3}$ to 1 molar, with a typical value of 0.5 molar, whereas the amino acid/metal cation ratio will normally be in the range of 1 to 6, with a typical value of 3. The solution may be concentrated by evaporation, with the purpose of adjusting the viscosity of the solution to facilitate coating steps. A flow chart showing the process is given in FIG. 1.

Film deposition onto a given substrate is accomplished by spin-or dip-coating, followed by pyrolysis at temperatures appropriate for the specific ceramic system. For spin-coatings, typical rotation rates are 1000-3000 rpm.

Figure 2:
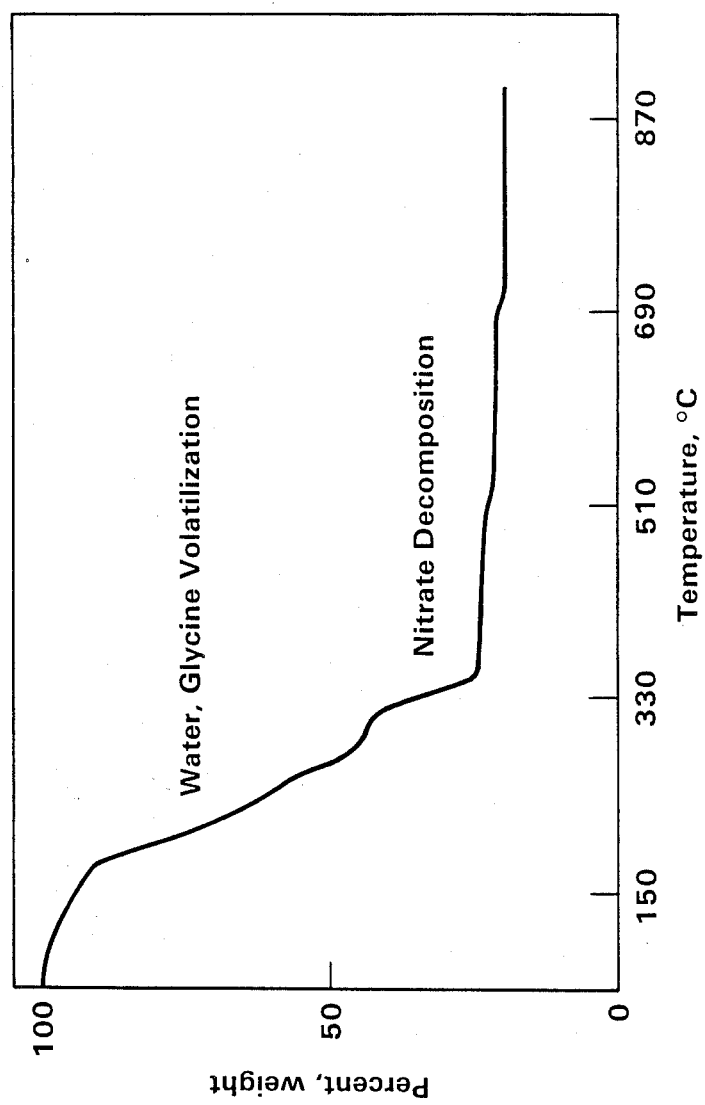
FIG. 2 is a graph showing a thermogravimetric analysis of the metal nitrate/glycine/aqueous solution used to produce thin films of the high critical temperature superconductor, $YBa_2Cu_3O_{7-x}$. Decomposition of the organic components and the nitrates was complete by approximately 700° C.

Pyrolysis of metal nitrate/amino acid thin films are usually performed in air at 700° C. or higher temperatures. The thermogravimetric data of FIG. 2 show pyrolysis to be essentially complete at 700° C. at a heating rate of 5° C. per minute. Typical thicknesses of the pyrolyzed films are 100 to 300 nm, although quality films of either greater or lesser thickness may be produced by this method. Depending on the specific ceramic system being considered, further heating to higher temperatures may be required to obtain the desired crystalline phase. For example, thin films of the high $T_c$ superconductor $YBa_2Cu_3O_{7-x}$ required heating at 950° C. for 1 to 5 minutes to obtain the tetragonal phase, followed by slow-cooling to 650° C. to transform the layer to obtain the desired orthorhombic phase.

Film Characterization

Thermogravimetric analysis((TGA) was used to reveal the various stages of decomposition of the precursor solution to a final ceramic film. Quadrupole mass spectrometry was used to identify gases released during pyrolysis. Film thicknesses were obtained from interference fringes using an ultraviolet-visible spectrophotometer. Compositional depth profiles of the pyrolyzed thin films were obtained using SIMS. Stylus profilometer measurements were used to establish a relation between actual depth and sputtering time in the SIMS analyses. X-ray photoelectron spectroscopy (XPS) was used to assess the quantity of impurities incorporated within the thin films.

Results and Discussion

Complexation and glass-forming properties of the low molecular weight amino acid are essential to this invention. The amine and carboxylic acid end groups securely bind metal cations in the aqueous solution, thereby both enhancing the solubility and inhibiting inhomogeneous precipitation. The metal nitrate/amino acid/water solutions are concentrated to optimize the solution viscosity for spin- or dip-coating. As the precursor solution is concentrated through evaporation of excess water, a glass-like material results, which is free of precipitates.

As given in FIG. 2, decomposition of the thin film precursor (composed of metal nitrates, an amino acid, and water) occurred in several stages. Water and glycine volatilization was essentially complete by 300° C.; nitrate decomposition occurred in several stages and was complete at 700° C. when heated at a rate of 5° C./h. Mass spectroscopic analysis of the off-gases revealed that a significant fraction of the amino acid was oxidized by nitrate ions to water, carbon monoxide, carbon dioxide, and nitrogen monoxide; however, some molecular glycine was also detected. Other than a small quantity of residual carbon, XPS analysis detected no contaminants within the pyrolyzed thin films.

Figure 3:
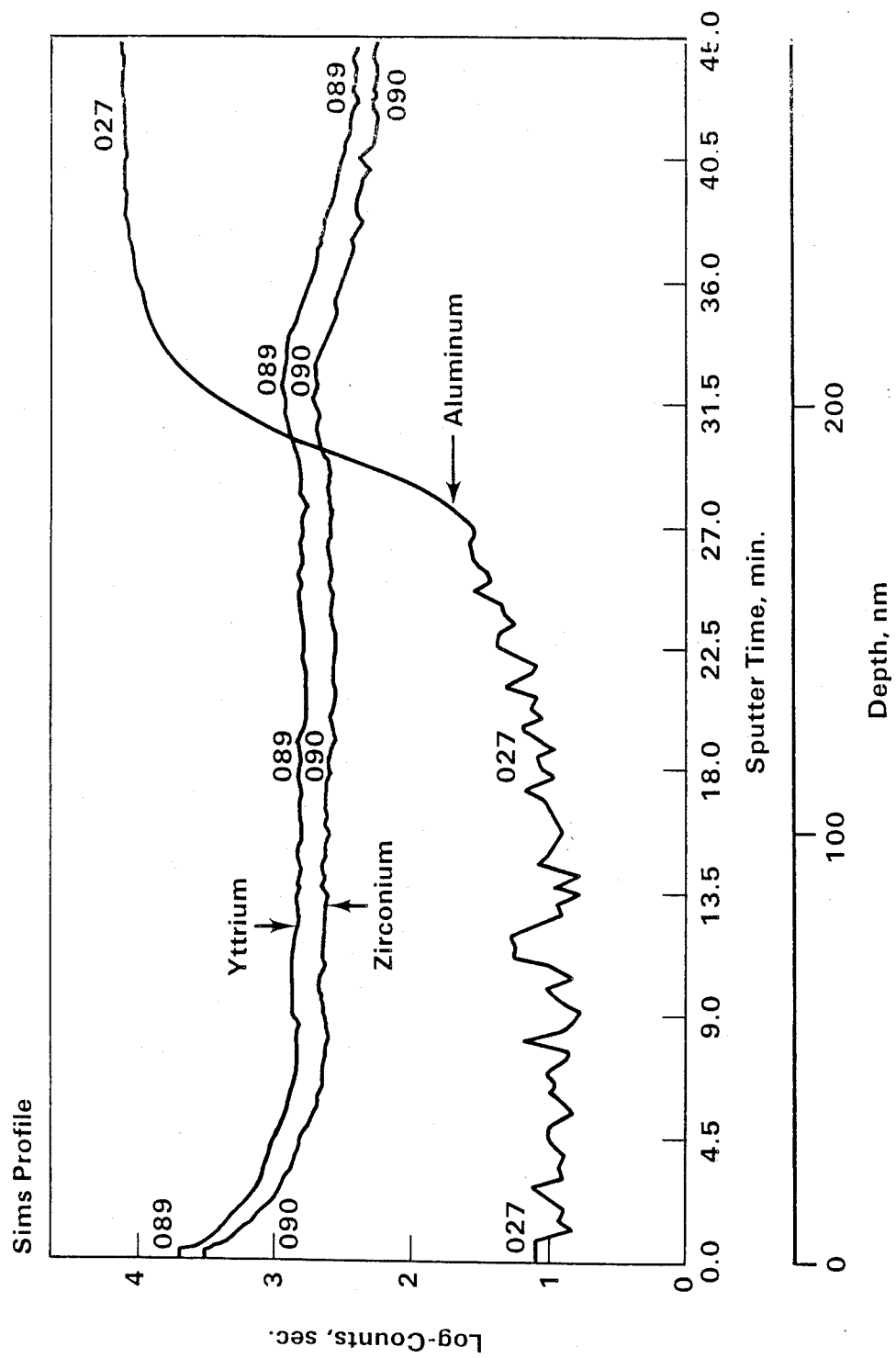
FIG. 3 is a secondary ion mass spectrometry (SIMS) depth profile of a yttria-stabilized zirconia layer (20 mole % $Y_2O_3$) on $Al_2O_3$. The depth scale was determined using a stylus profilometer. Because of differing sensitivities of the SIMS technique to the various components, the signal intensities should not be taken as an absolute reflection of composition, but rather an indication of the variation in composition of an individual component as a function of depth.
Figure 4:
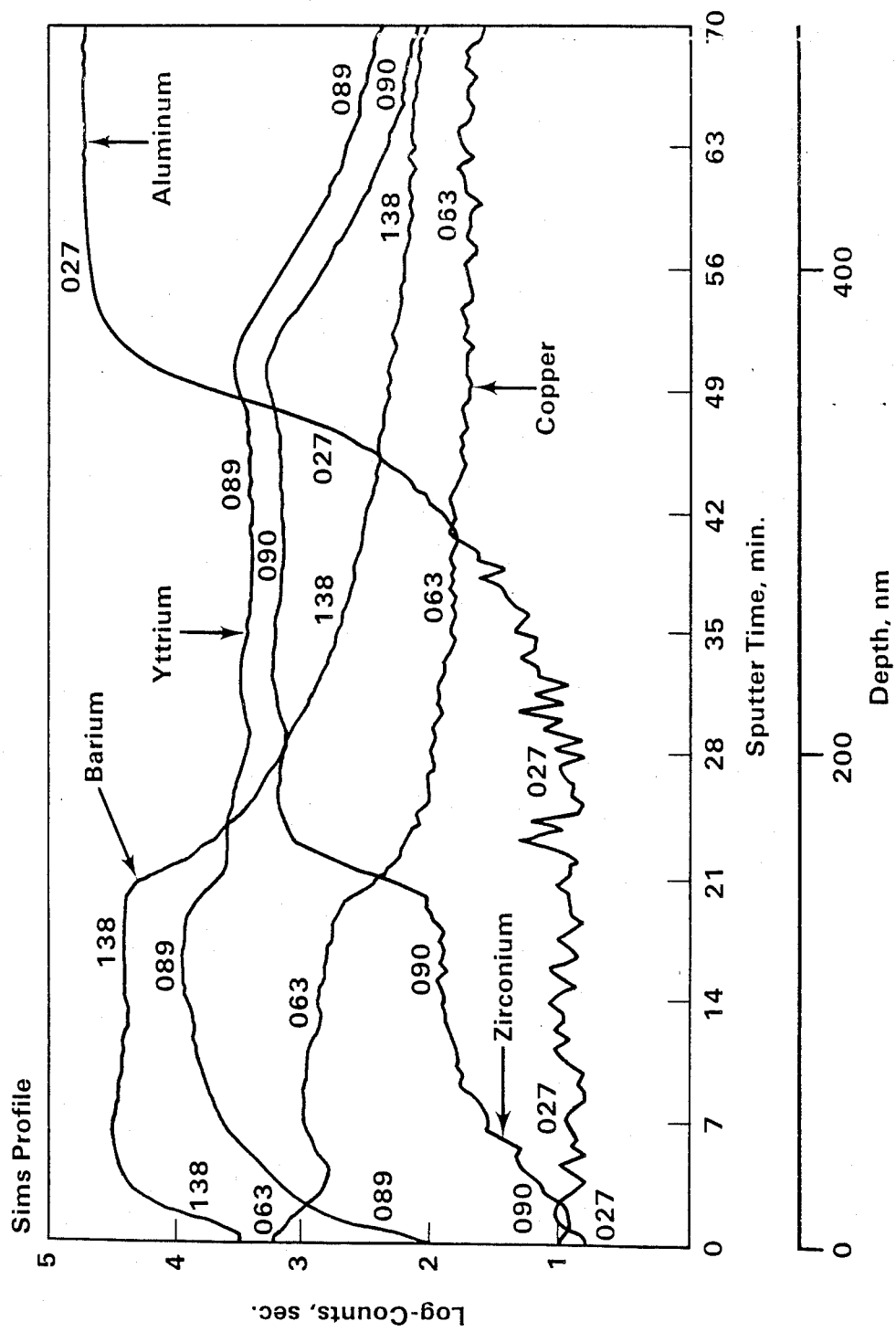
FIG. 4 is a SIMS depth profile of a spin-coated $YBa_2Cu_3O_{7-x}$ film on $SiO_2$ that had been precoated with a yttria-stabilized zirconia barrier layer. The purpose of the buffer layer was to prevent interactions between the superconducting film and the substrate.

To date, the method described here has been demonstrated for the high critical temperature superconductor $YBa_2Cu_3O_{7-x}$, for several compositions in the series $(La,Sr)CrO_3$, and for several zirconia compositions including unstabilized, partially stabilized (9 mole % $Y_2O_3$), and fully stabilized (20 mole % $Y_2O_3$) zirconia. A SIMS depth profile of a fully stabilized zirconia film on alumina is given in FIG. 3. The lack of detection of aluminum above the noise level in the SIMS profile at the outer surface is an indication of the excellent uniformity of this film. In FIG. 4, a SIMS depth profile of a $YBa_2Cu_3O_{7-x}$ superconducting film deposited on a yttria-stabilized zirconia buffer layer on alumina is given. Thus, it is clear that multiple layers having quite complex compositions can be deposited onto a substrate using this method. It is expected that this new chemical route can be applied to a much wider variety of thin ceramic films than are described here.

While we have described certain embodiments of our invention in considerable detail, it will be realized by those skilled in the art that various changes can be made. Application is limited only by the requirement that the metal salt be soluble in an aqueous solution containing the amino acid. We therefore wish our invention to be limited solely by the scope of the appended claims.

REFERENCES

1. H. Schroeder, Phys. Thin Films, 5, 87 (1969).
2. B. E. Yoldas and T. W. O'Keefe, Appl. Opt., 18, 3133 (1979).
3. C. Feldman, J. Appl. Phys. 27, 870 (1956).
4. M. G. Pechini, U.S. Pat. No. 3,330,697 (1967).

A relatively large volume of other articles have been written concerning various chemical routes to production of thin ceramic films. Two books, *Better Ceramics Through Chemistry*, eds. C. J. Brinker, D. E. Clark, and D. R. Ulrich, Materials Research Society Proceedings, Volume 32, North-Holland, N. Y., 1984, and *Better Ceramics Through Chemistry II*, eds. C. J. Brinker, D. E. Clark, and D. R. Ulrich, Materials Research Society Symposia Proceedings, Volume 73, Materials Research Society, Pittsburgh, Pa. 1986 contain a number of pertinent articles.

We claim as our invention:

1. A method of forming oxide ceramic films, which comprises use of an aqueous solution of soluble metal salts and a low molecular weight amino acid, coating said solution onto a substrate, and pyrolyzing said film.
2. A method as defined in claim 1, wherein said metal salt is a nitrate.
3. A method as defined in claim 1, wherein said low molecular weight amino acid is glycine.
4. A method as defined in claim 1, wherein said ceramic film is zirconia, $ZrO_2$.
5. A method as defined in claim 1, wherein said ceramic film is zirconia stabilized with yttria, $(Zr, Y)O_2$.
6. A method as defined in claim 1, wherein said film is $YBa_2Cu_3O_{7-x}$.
7. A method as defined in claim 1, wherein said film is lanthanum strontium chromite, $(La, Sr)CrO_3$.

* * * * *